Figure 1:
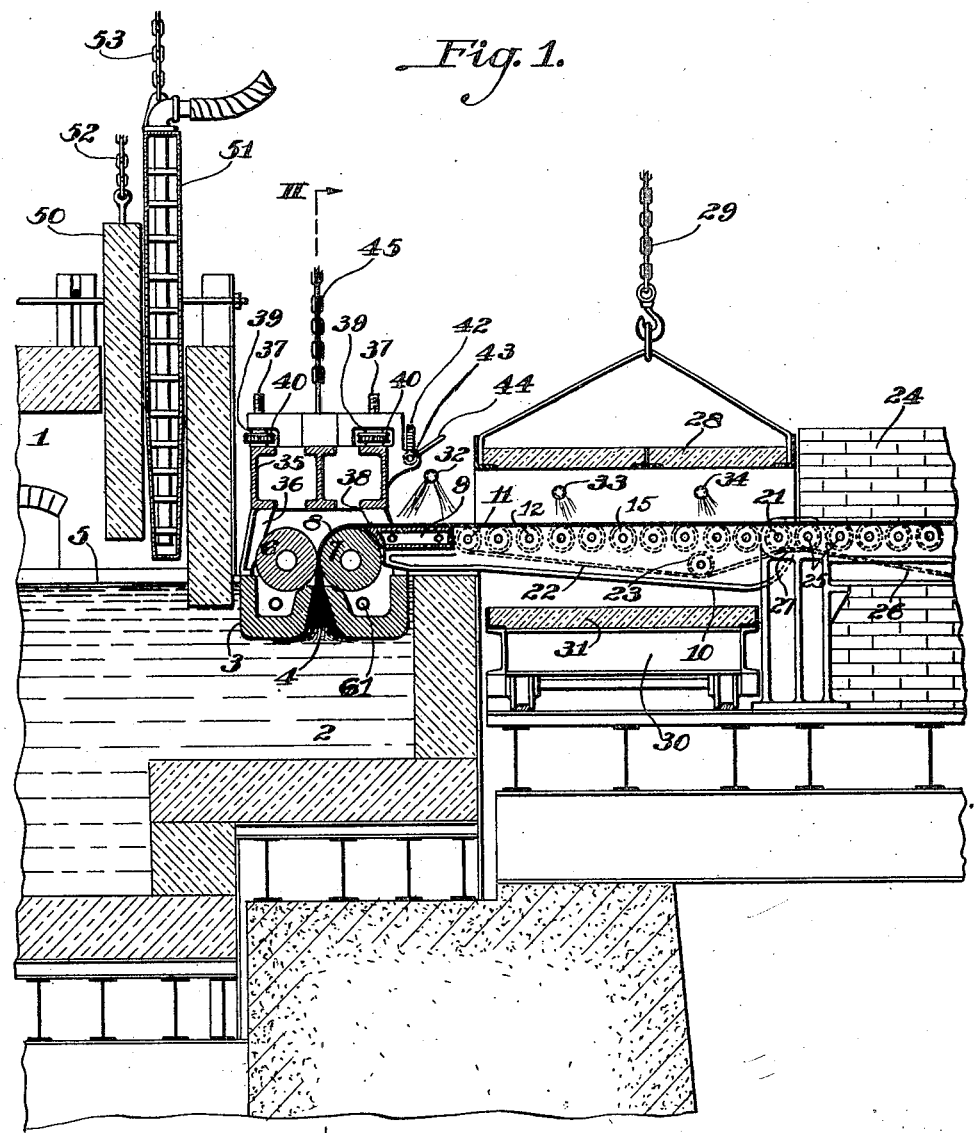

Dec. 14, 1926.
F. GELSTHARP
1,610,367
APPARATUS FOR MAKING PLATE GLASS
Filed May 18, 1925  3 Sheets-Sheet 1

INVENTOR
Frederick Gelstharp
by
James C. Bradley
atty

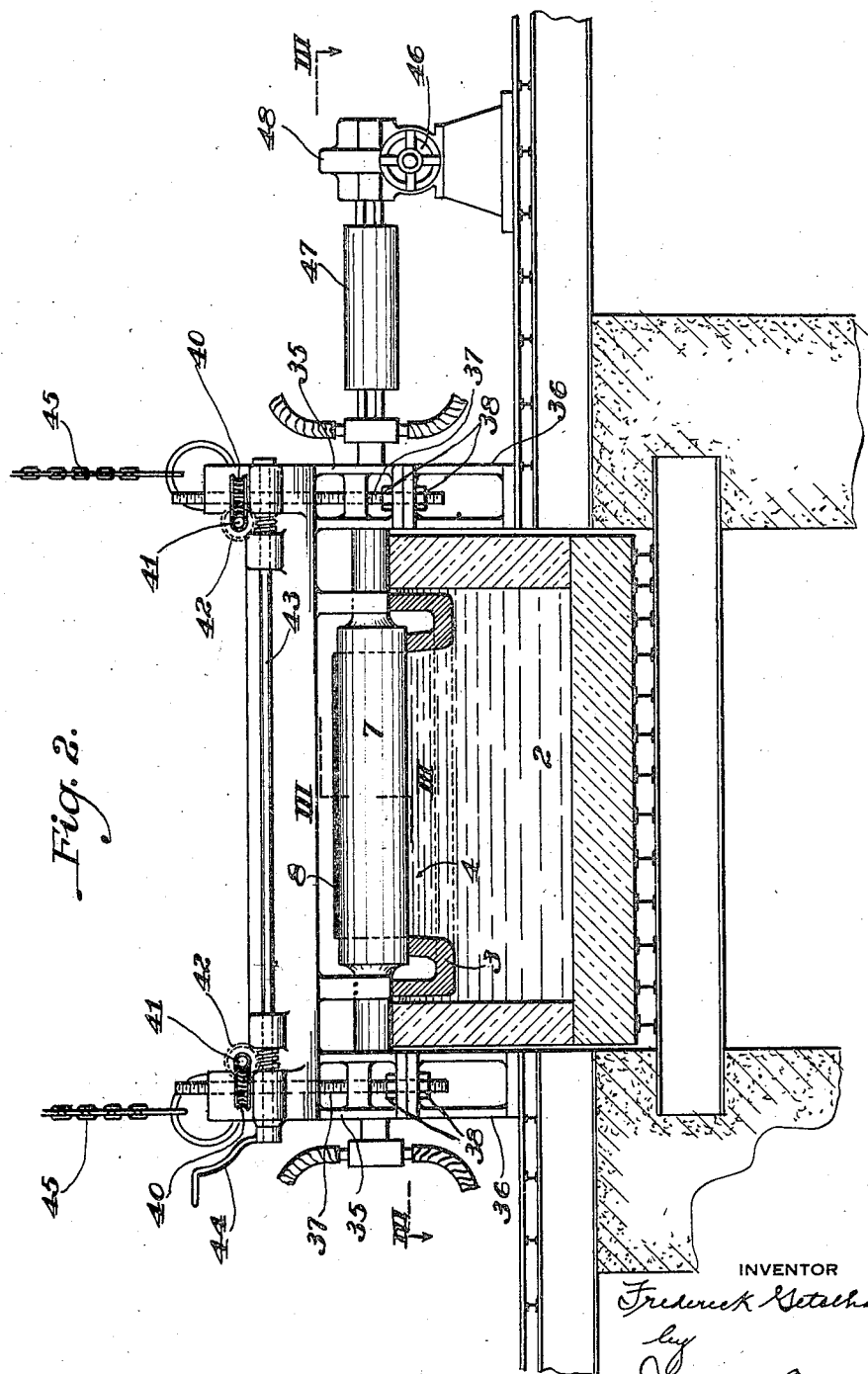

Dec. 14, 1926.　　　　　　　　　　　　　　　　　　　　1,610,367
F. GELSTHARP
APPARATUS FOR MAKING PLATE GLASS
Filed May 18, 1925　　　　3 Sheets-Sheet 3
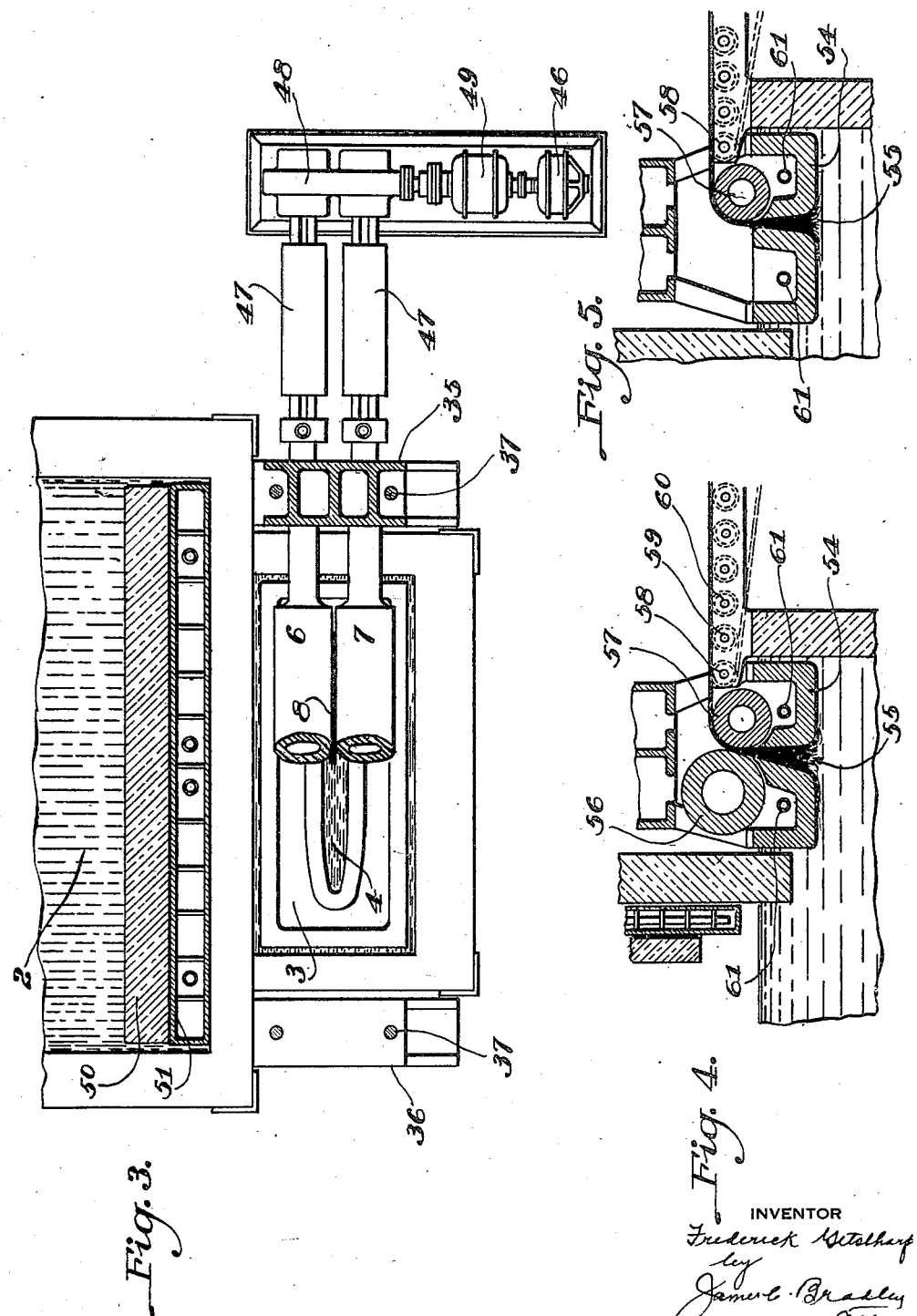
INVENTOR
Frederick Gelstharp
by
James C. Bradley
Atty Patented Dec. 14, 1926.

1,610,367

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

APPARATUS FOR MAKING PLATE GLASS.

Application filed May 18, 1925. Serial No. 30,949.

The invention relates to apparatus for producing a continuous sheet or ribbon continuously from a body of molten glass. It has for its primary object the provision of improved means for accomplishing the function as above set forth and for producing glass of superior quality, which is perfectly flat and relatively smooth, so that it requires a minimum amount of grinding preliminary to polishing in the production of finished plate glass. Certain embodiments of the invention are illustrated in the accompanying drawings wherein:

Figure 1 is a longitudinal vertical section through the apparatus. Fig. 2 is a section on the line II—II of Fig. 1. Fig. 3 is a section on the line III—III—III—III of Fig. 2. And Figs. 4 and 5 are longitudinal sections through modifications.

Referring to Fig. 1, the reference numeral 1 indicates the end of a melting tank, preferably of the regenerator type, which has at one end a forehearth or kiln 2, from which the withdrawal of the glass occurs. Seated in the glass of the forehearth is the outlet member 3, provided with the vertical outlet slot 4, the member 3 being preferably pressed down into the glass, so that the upper end of the outlet slot 4 lies slightly below the level 5 of the glass in the melting tank. Mounted above the upper end of the outlet slot 4 are a pair of driven water cooled rolls 6 and 7 for drawing the glass upwardly and at the same time, sizing it. The sheet 8 which is formed in this manner is turned laterally over the roll 7 and onto the platen or table 9, which is hollow and water cooled. The glass then passes onto the apron 10 carrying the series of rolls 11 to 21, also preferably hollow and either air or water cooled. These rolls are driven by means of a chain 22 passing around sprockets on the ends of the roll shafts, the sprocket 23 acting as a take-up for the chain.

In alignment with the apron is a leer 24 provided with a series of rolls 25 for receiving the glass and carrying it through the leer. These rolls are driven by means of a chain 26 passing over sprockets carried by the ends of the roll shafts. The end roll 21 of the series of apron rolls is driven from the end roll 25 of the series of leer rolls by means of a short chain 27 passing around the sprockets on the ends of the two rolls. Mounted above the apron is a portable cover 28 supported from above by means of the chain 29 and removable by means of a suitable crane. Beneath the apron is a truck 30 which carries a refractory bottom member 31. The member 31 assists in maintaining temperature conditions constant in the space surrounding the glass thereabove. The truck permits the member 31 to be removed to one side, when the apron is removed, in order to give more ready access to the front end of the furnace for repairs and replacements. The space above the apron and above the table 9 is preferably heated by means of the burners 32, 33 and 34.

The position of the outlet member 3 may be adjusted by means of the bridge 35 in which the ends of the rolls are journaled. This bridge is supported at its ends upon a pair of standards 36, 36 as indicated in Fig. 2 and is adjustable up and down by means of the screws 37, 37 swiveled in the upper sides of the standards, as indicated at 38, 38. These screws work through nuts 39, 39 (Fig. 1) swiveled in the bridge and provided with the worm wheels 40, 40. The worm wheels are rotated from suitable worms carried by the transverse shafts 41, 41 having at their outer ends the worm wheels 42, 42. The worm wheels 42, 42 are operated from the shaft 43 carrying a pair of worms engaging the worm wheels and operated by means of the handle 44. By this arrangement, the slot member 3 may be adjusted vertically depending upon the level of the glass in the tank and to meet other conditions which may arise. Provision is made for removing the bridge by means of an overhead crane to which the bridge is attached by means of the chains 45.

The rolls 6 and 7 are driven from the motor 46 through connections, including the tumbler shafts 47, 47 connected at one end to the ends of the rolls and at the other ends to the ends of short countershafts carried in the casing 48. These counter shafts carry suitable worm wheels driven from a transverse worm shaft, also located in the casing 48. This worm shaft is operated from the motor 46 through the intermediary of suitable reducing gearing in the casing 49.

Provision is made for cutting off the flow of glass to the forehearth 2 in the form of a vertically movable clay gate 50 and a water cooled metal gate 51, both of said gates being supported upon suitable cranes above by means of the chains 52 and 53.

Fig. 4 illustrates a modification in which the outlet member 54 has its slot 55 inclined slightly to the right. The rolls 56 and 57 have their axes arranged at different vertical elevations instead of at the same elevation, as in the Fig. 1 construction and the roll 56 is larger in diameter than the roll 57. The glass sheet as it is formed passes onto the water cooled rolls 58, 59, 60, etc., which constitute the apron, the table 9 of the Fig. 1 construction being omitted in this Fig. 4 arrangement. By this arrangement, the chilling effect of the sizing rolls is reduced as compared with that of the Fig. 1 construction, since the length of contact between the roll 57 and the glass is less than that between the roll 7 and the glass in the Fig. 1 construction. In both constructions, suitably slotted air pipes 61 may be employed between the slot member and the rolls in order to assist in cooling the slot member and the rolls.

Fig. 5 illustrates a further modification corresponding throughout to the structure of Fig. 4 except that the roll 56 of such Fig. 4 construction is omitted, so that the glass is not sized as in the other forms of apparatus.

What I claim is:

1. In combination, a glass tank containing a body of molten glass, an outlet member seated in the glass from above, and having a vertical outlet slot therethrough, a pair of driven and cooled sizing rolls above the slot extending longitudinally of the slot at the outlet end thereof adapted to receive the glass and size it, and a glass receiving bed extending laterally from the side of one of said rolls for carrying away the glass which is formed.

2. In combination, a glass tank containing a body of molten glass, an outlet member seated in the glass, and having a vertical outlet slot therethrough, a pair of driven and cooled sizing rolls extending longitudinally of said slot at the outlet end thereof adapted to receive the glass and size it, and a glass receiving bed extending laterally from the side of one of said rolls for carrying away the glass which is formed, the said outlet member being pressed down into the glass so that the slot is under the head pressure of the tank.

3. In combination, a glass tank containing a body of molten glass, an outlet member seated in the glass, and having a vertical outlet slot therethrough, a pair of driven and cooled sizing rolls extending longitudinally of said slot at the outlet end thereof adapted to receive the glass and size it, means for adjusting the outlet member vertically in the glass, and a glass receiving bed extending laterally from the side of one of said rolls for carrying away the glass which is formed.

4. In combination, a glass tank containing a body of molten glass, an outlet member seated in the glass, and having a vertical outlet slot therethrough, a pair of driven and cooled sizing rolls extending longitudinally of said slot at the outlet end thereof adapted to receive the glass and size it, a frame in which said rolls are journaled engaging said outlet member, means for adjusting said frame vertically and thus adjusting the position of the outlet member and a glass receiving bed extending laterally from the side of one of said rolls for carrying away the glass which is formed.

5. In combination, a glass tank containing a body of molten glass, a refractory outlet member seated in the glass and having a vertical outlet slot therethrough, a cooled roll extending longitudinally of said slot at the outlet end thereof adapted to receive the glass as it emerges from the slot, means for adjusting the outlet member vertically in the glass, and a fluid cooled glass receiving bed extending laterally from the side of said roll for carrying away the glass which is formed.

In testimony whereof, I have hereunto subscribed my name this 11th day of May, 1925.

FREDERICK GELSTHARP.